US012018155B1

(12) United States Patent
Bly et al.

(10) Patent No.: US 12,018,155 B1
(45) Date of Patent: Jun. 25, 2024

(54) PROCESS OIL FOR RUBBER COMPOUNDING

(71) Applicant: POET Research, Inc., Sioux Falls, SD (US)

(72) Inventors: Steven T. Bly, Sioux Falls, SD (US); Alex T. McCurdy, Sioux Falls, SD (US)

(73) Assignee: POET RESEARCH, INC., Sioux Falls, SD (US)

( * ) Notice: Subject to any disclaimer, the term of this patent is extended or adjusted under 35 U.S.C. 154(b) by 544 days.

(21) Appl. No.: 17/133,237

(22) Filed: Dec. 23, 2020

Related U.S. Application Data

(60) Provisional application No. 62/954,340, filed on Dec. 27, 2019.

(51) Int. Cl.
C08L 91/02 (2006.01)
B60C 1/00 (2006.01)
C08L 9/06 (2006.01)
C11B 1/02 (2006.01)
C11B 1/12 (2006.01)
C11B 3/04 (2006.01)

(52) U.S. Cl.
CPC ............ C08L 91/02 (2013.01); B60C 1/0016 (2013.01); C08L 9/06 (2013.01); C11B 1/025 (2013.01); C11B 1/12 (2013.01); C11B 3/04 (2013.01)

(58) Field of Classification Search
CPC .......... C08L 91/02; C08L 9/06; B60C 1/0016; C11B 1/025; C11B 1/12; C11B 3/04
See application file for complete search history.

(56) References Cited

U.S. PATENT DOCUMENTS

| | | | |
|---|---|---|---|
| 4,220,574 A | 9/1980 | Perrone | |
| 5,580,513 A | 12/1996 | Patitsas | |
| 6,448,318 B1 | 9/2002 | Sandstrom | |
| 6,846,444 B2 | 1/2005 | Beers et al. | |
| 6,998,088 B2 | 2/2006 | Beers et al. | |
| 7,119,147 B2 | 10/2006 | Kikuchi et al. | |
| 7,211,611 B2 | 5/2007 | Wilson et al. | |
| 7,432,318 B2 | 10/2008 | Kikuchi | |
| 7,946,323 B2 | 5/2011 | Kikuchi et al. | |
| 8,044,118 B2 | 10/2011 | Sakaki et al. | |
| 8,563,628 B2 | 10/2013 | Sakaki et al. | |
| 9,516,891 B1 * | 12/2016 | Roa-Espinosa | ........... C02F 9/00 |
| 9,650,503 B2 | 5/2017 | Sandstrom et al. | |
| 9,771,469 B2 | 9/2017 | Sandstrom et al. | |
| 9,846,954 B2 | 12/2017 | Stubblefiled et al. | |
| 9,850,070 B2 | 12/2017 | Beyer | |
| 9,902,837 B2 | 2/2018 | Moutinho et al. | |
| 10,035,383 B2 | 7/2018 | Kaszas et al. | |
| 10,160,847 B2 | 12/2018 | Lesage et al. | |
| 10,179,479 B2 | 1/2019 | Boley et al. | |
| 10,207,540 B2 | 2/2019 | Cato et al. | |
| 10,227,479 B2 | 3/2019 | Styer | |
| 10,384,958 B2 | 8/2019 | Tran | |
| 2002/0123574 A1 | 9/2002 | Nguyen et al. | |
| 2003/0212168 A1 | 11/2003 | White | |
| 2004/0113318 A1 | 6/2004 | Beers et al. | |
| 2004/0127652 A1* | 7/2004 | Majumdar | ......... B29D 30/0061 152/565 |
| 2008/0314294 A1 | 12/2008 | White et al. | |
| 2009/0229720 A1 | 9/2009 | Serra et al. | |
| 2009/0253892 A1* | 10/2009 | Bischoff | ................... B60C 1/00 528/373 |
| 2012/0059084 A1 | 3/2012 | Brown et al. | |
| 2013/0096248 A1* | 4/2013 | Thompson | ............ B60C 1/0016 524/526 |
| 2013/0289183 A1 | 10/2013 | Kerns et al. | |
| 2014/0135424 A1 | 5/2014 | Sandstrom et al. | |
| 2014/0135437 A1 | 5/2014 | Sandstrom et al. | |
| 2014/0371346 A1 | 12/2014 | Saintigny et al. | |
| 2015/0107733 A1 | 4/2015 | Sandstrom | |
| 2015/0283854 A1 | 10/2015 | Saintigny et al. | |
| 2017/0058112 A1 | 3/2017 | Kerns et al. | |
| 2017/0313861 A1 | 11/2017 | Winston et al. | |
| 2018/0009971 A1 | 1/2018 | Styer | |
| 2018/0141378 A1 | 5/2018 | Park et al. | |
| 2018/0148566 A1 | 5/2018 | Rodewald et al. | |
| 2018/0148575 A1 | 5/2018 | Kurth et al. | |
| 2018/0244103 A1 | 8/2018 | Chansorn et al. | |
| 2018/0340068 A1* | 11/2018 | McCurdy | ................ C11C 3/003 |
| 2019/0002697 A1 | 1/2019 | Chisholm et al. | |
| 2019/0134930 A1 | 5/2019 | Randall et al. | |
| 2019/0184744 A1 | 6/2019 | Isitman et al. | |
| 2019/0203020 A1 | 7/2019 | Styer | |
| 2019/0225778 A1 | 7/2019 | Weydert et al. | |
| 2019/0249109 A1 | 8/2019 | Lamprecht et al. | |
| 2019/0376002 A1* | 12/2019 | Urban | ..................... C11B 13/00 |

FOREIGN PATENT DOCUMENTS

| | | |
|---|---|---|
| EP | 1544238 | 6/2005 |
| EP | 1559585 | 8/2005 |
| WO | 2016043805 | 3/2016 |
| WO | 2016084984 | 6/2016 |
| WO | 2016105932 | 6/2016 |

OTHER PUBLICATIONS

Kerr BJ, Dozier WA, Shurson GC. Lipid digestibility and energy content of distillers' corn oil in swine and poultry. J Anim Sci. Jul. 2016;94(7):2900-8. doi: 10.2527/jas.2016-0440. PMID: 27482676. (Year: 2016).*

Chandrasekara et al. (2011) "Epoxidized vegetable oils as processing aids and activators in carbon-black filled natural rubber compounds" J. Natl. Sci. Found. Sri Lanka 39:243.

Goodyear News Release (2017) "Goodyear Using Soybean Oil-Based Rubber in Tires" Available at: https://corporate.goodyear.com/en-US/media/news/goodyear-using-soybean-oil-based-rubber-in-tires.html 2 pages.

Jayewardhana et al. (2009) "Study on natural oils as alternative processing aids and activators in carbon black filled natural rubber" J. Natl. Sci. Found. Sri Lanka 37:187-193.

(Continued)

Primary Examiner — Doris L Lee
(74) Attorney, Agent, or Firm — Honigman LLP

(57) ABSTRACT

Process oils comprising distiller's corn oil are incorporated into rubber compositions useful for manufacturing tires or various tire components including tire sub-treads.

24 Claims, 10 Drawing Sheets

(56) References Cited

OTHER PUBLICATIONS

Li et al. (2016) "Toward replacement of petroleum oils by modified soybean oils in elastomers" Rubber Chem. Technol. 89:608-630.
Norwood IV (2014) "Introduction of Natural Oils into Rubber Compounds" Undergraduate Honors Theses. Paper 198. http://dc.etsu/honors/198.
Sulfur Cure Activators. "Activators for Sulfur Vulcanization" Available at: http://polymerdatabase.com/polymer%20chemistry/Accelerated%20Vulcanization%20Mechanism.html(Accessed: Jan. 17, 2019).
Syamin et al. (2017) "Evaluation of Cooking Oil as Processing Addtive for Natural Rubber" Asean J. Sci. Technol. Dev. 34(1):17-25.

* cited by examiner

PROCESS OIL FOR RUBBER COMPOUNDING

RELATED APPLICATIONS

This application claims priority under 35 U.S.C. 119(e) to U.S. Provisional Patent Application Ser. No. 62/954,340, entitled "Process Oil for Rubber Compounding", filed Dec. 27, 2019, the disclosure of which is hereby incorporated by reference in its entirety.

FIELD

This disclosure relates to distiller's corn oil used as a process oil in rubber compositions including pneumatic tires, and methods for making such rubber compositions.

BACKGROUND

The manufacture of rubber can be costly due to the energy consumption during production. Also, some rubber compounds can be more susceptible to tearing, abrasion, and crack growth. In order to meet rubber specification criteria, process oils can be added to improve the characteristics of the rubber compound. Process oils used in the manufacture of rubber products vary in quality, price, and accessibility. Typical process oils are naphthenic and paraffinic oils which can cost around $0.70/lb.

Some literature indicates that inclusion of vegetable oils in rubber compounds can cause the tensile and elongation to worsen upon aging. For example, Jayewardhana et al. (*J. Natl. Sci. Found. Sri Lanka* 37, 187-193, 2009) state that high unsaturation, like that found in a vegetable oil such as corn oil, result in higher crosslink density as well as introduction of double bonds that are subject to degradation.

Additional publications recite the rubber formulations comprising vegetable oil:

US 2014/0135437 A1 mentions tire rubber tread with resin and soybean oil.

U.S. Pat. No. 9,771,469 mentions tire rubber tread for promoting wet traction and service at low temperatures containing soybean oil.

US 2017/0058112 A1 mentions a vegetable oil extended rubber containing soy oil and tire with those components.

WO 2016/084984 A1 mentions tread rubber compositions for winter tires for low temperature grip improvement containing corn oil or other vegetable oils.

WO 2016/105932 A1 mentions rubber compositions of tires for subtread material which includes components from one or more renewable resources, such as plant oil and other vegetable oils.

EP 1559585B1 mentions a rubber composition for tires comprising 5-100 phr fatty acid obtained from vegetable oil having iodine value of at least 80.

U.S. Pat. No. 7,119,147 B2 mentions a rubber composition containing vegetable oil.

U.S. Pat. No. 9,902,837 B2 mentions oil extended SB copolymer with transesterified vegetable oil.

There is a need to identify and explore alternative process oils for use in rubber compositions which satisfy the industry standards.

BRIEF SUMMARY

Provided herein are rubber compositions comprising corn oil having increased amounts of free fatty acid (FFA) and decreased amounts of fatty acid alkyl ester (FAAE). Also provided are methods of making the rubber compositions. Such compositions are useful for production of tires.

Provided herein are rubber compositions comprising: an elastomer; and a process oil comprising corn oil having an FFA content greater than 4% w/w of the total corn oil and FAAE content less than 16% w/w of the total corn oil. In some aspects, the composition comprises about 2 to about 70 parts corn oil per hundred rubber (PHR), for example, about 2 to about 60 PHR, about 2 to about 50 PHR, or about 2 to about 40 PHR. The elastomer can be styrene-butadiene rubber (SBR), ethylene propylene diene monomer (EPDM), natural rubber (NR), nitrile rubber (NBR), a component of natural rubber, polybutadiene or mixtures thereof.

In some embodiments, the rubber composition comprises one or more of: one or more fillers; one or more activators; one or more antioxidants; one or more curatives; and one or more accelerators. In some aspects, the rubber composition comprises between 20 PHR and 100 PHR filler; between 1 PHR and 10 PHR activator; between 0.1 PHR and 5 PHR antioxidant; between 0.1 and 2.0 PHR curative; and between 0.1 and 3.0 PHR accelerator.

In some aspects, the corn oil is distiller's corn oil, such as, for example, post fermentation distiller's corn oil or post distillation distiller's corn oil. The corn oil can have been processed, in some aspects, to increase the FFA content during fermentation or post-fermentation, by exposure to heat in the presence of water, by exposure to one or more enzymes in the presence of water, by exposure to an acid or a pH less than 8, saponification of oil with caustic and subsequent acidification to FFA, or any combination thereof. In some aspects, FFA is added to the corn oil to increase FFA content.

In some aspects, the rubber composition comprises corn oil wherein the corn oil is the separation product of a post-fermentation emulsion exposed to a pH of less than 8 to isolate the corn oil with an increased FFA content.

In some aspects, the rubber composition comprises corn oil wherein the corn oil is distiller's corn oil exposed to a caustic to saponify the corn oil, then exposed to an acid to generate FFA.

In some embodiments, the FFA is stearic acid, palmitic acid, oleic acid, linoleic acid, linolenic acid, and mixtures thereof.

In some embodiments, the rubber composition comprises corn oil that has been processed to reduce FAAE. Exemplary FAAEs include, but are not limited to, fatty acid ethyl esters (FAEEs), fatty acid methyl esters (FAMEs), and fatty acid propyl esters (FAPEs).

In some aspects, the corn oil is a first fraction of corn oil separated from a corn oil by a separation operation to produce the first fraction having relatively low FAAE and a second fraction having relatively high FAAE, for example, via a short path evaporator. The first fraction can include FFA added after the first fraction separated from the corn oil. In some aspects, the first fraction has been treated with an enzyme to increase FFA content after the first fraction has been separated from the corn oil.

In some aspects, the separation operation can include a distillation operation and/or a short path evaporator. The separation operation can include (i) adjusting the temperature of the corn oil and (ii) filtering or centrifuging the corn oil.

In some aspects, the separation operation can include neutralizing the corn oil and filtering or centrifuging it.

Also provided herein is a process for formulating rubber comprising: (i) combining an elastomer with a process oil comprising corn oil having an FFA content greater than 4% w/w of the total corn oil and FAAE content less than 16% w/w of the total corn oil, a filler, an activator, and an antioxidant; (ii) mixing the components from (i) at a temperature of at least about 210° F. to form a master batch; (iii) adding a sulfur curative to the master batch; and (iv) mixing the sulfur curative and master batch at a temperature of at least about 180° F. to form a final pass mix. In some aspects, the process further comprises (v) vulcanizing the final pass mix at a temperature of at least about 290° F. for at least 10 minutes.

Also provided herein is a rubber process oil comprising corn oil having an FFA content greater than 4% w/w of the total corn oil and FAAE content less than 16% w/w of the total corn oil.

Other objects and advantages will become apparent from a review of the ensuing detailed description.

DESCRIPTION

Figure 1:
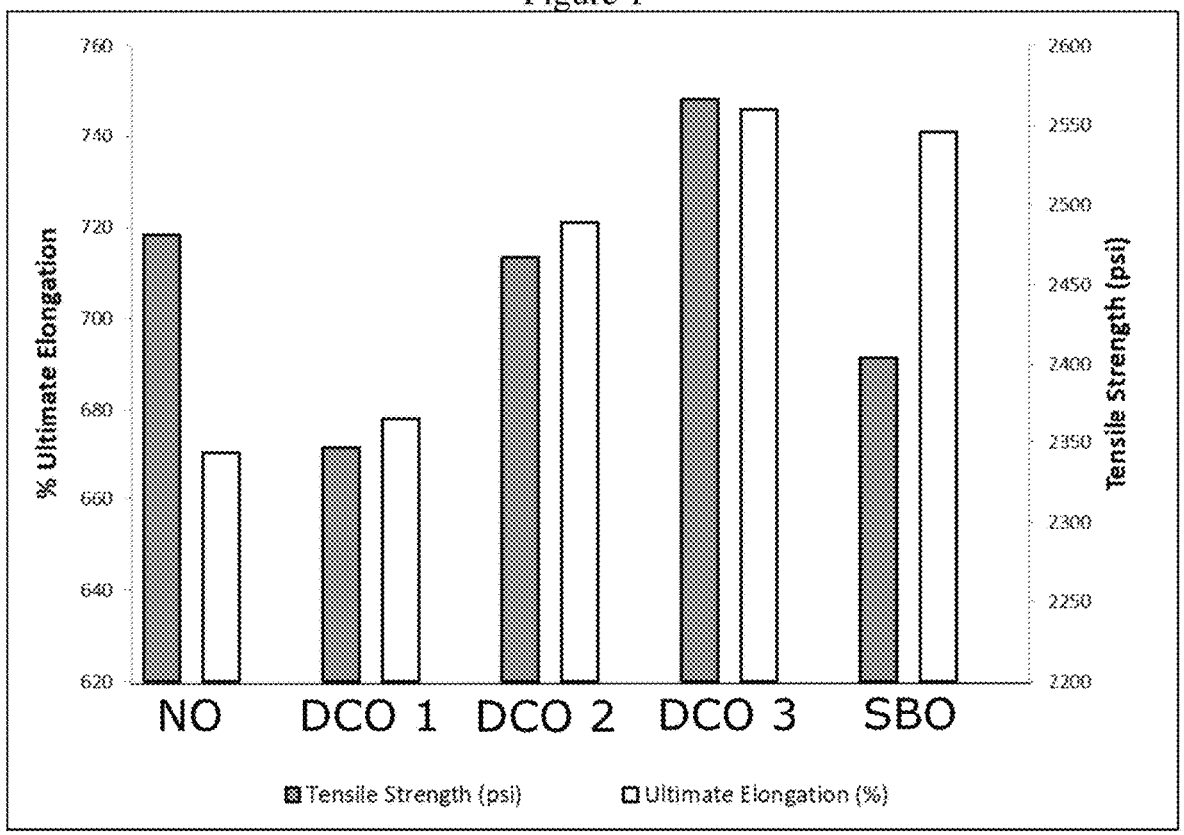
FIG. 1 provides the tensile strength (psi) and ultimate elongation (%) per ASTM D412 and ASTM 2240e1 for each rubber compound.

It is to be understood that this invention is not limited to particular compositions, methods, and experimental conditions described, as such methods and conditions may vary. It is also to be understood that the terminology used herein is for the purpose of describing particular embodiments only, and is not intended to be limiting, since the scope of the present invention will be limited only by the appended claims.

As used in this specification and the appended claims, the singular forms "a", "an", and "the" include plural references unless the context clearly dictates otherwise. Thus, for example, a reference to "a method" includes one or more methods, and/or steps of the type described herein and/or which will become apparent to those persons skilled in the art upon reading this disclosure and so forth.

The word "exemplary" is used to mean serving as an example, instance, or illustration. Any embodiment or design described as "exemplary" is not necessarily to be construed as preferred or advantageous over other embodiments or designs, nor is it meant to preclude equivalent exemplary structures and techniques known to those of ordinary skill in the art. Rather, use of the word exemplary is intended to present concepts in a concrete fashion, and the disclosed subject matter is not limited by such examples.

The term "or" is intended to mean an inclusive "or" rather than an exclusive "or." To the extent that the terms "comprises," "has," "contains," and other similar words are used in either the detailed description or the claims, for the avoidance of doubt, such terms are intended to be inclusive in a manner similar to the term "comprising" as an open transition word without precluding any additional or other elements.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All patents, applications and non-patent publications mentioned in this specification are incorporated herein by reference in their entireties.

It has been determined by the inventors that introduction of vegetable oils, including distiller's corn oil (DCO), improves the performance of the rubber compounds in a number of evaluations including: tensile strength, elongation, modulus, heat aging, tear properties, DIN abrasion, and DeMattia flex resistance. DCO compositions with high free fatty acid (FFA) and low fatty acid alkyl ester (FAAE) give the surprising performance results when used as process oils in rubber compositions. Incorporation of DCO in the rubber formulation can improve the vulcanization process by altering the curing time and lowering the energy consumption during manufacture due to viscosity improvements as shown herein. In addition, less DCO can be used than a petroleum-derived process oil to achieve the same or better rubber properties.

In a conventional ethanol plant, corn is used as a feedstock and ethanol is produced by fermentation of the starch contained within the corn. The fermentation product includes ethanol, water, and soluble components as well as residual unfermented particulate matter (among other things). The fermentation product is distilled and dehydrated to recover ethanol. The residual matter (e.g., whole stillage) comprising water, soluble components, oil, and unfermented solids can be further processed to separate out desirable fermentation by-products, for example, corn oil.

Corn oil from the fermentation product can be recovered from fermentation residue according to conventional processes, e.g., extracted post-fermentation as a co-product of dry grind ethanol production or conventional ethanol production. Corn oil extraction may be carried out by single or double pass centrifugation steps, and with or without the use of demulsifiers or caustic to improve oil isolation from the remaining aqueous phase. Corn oil can also be provided from fermentation residue by adjusting the pH of the corn fermentation residue to provide a corn oil layer and an aqueous layer; and separating the corn oil layer from the aqueous layer. Corn oil with increased FFAs can also be obtained by exposing the corn oil to heat in the presence of water, exposing the corn oil to one or more enzymes in the presence of water, exposing the corn oil to acid in the presence of water, exposing the corn oil to a pH of less than about 8, or exposing the corn oil to a caustic to saponify the corn oil and then an acid. Finally, the FFA content of a corn oil can be increased by simply adding FFAs to the corn oil. The FFA can be stearic acid, palmitic acid, oleic acid, linoleic acid, linolenic acid, and mixtures thereof. The distiller's corn oil can contain at least 4% w/w FFAs, for example, at least 10%, at least 12%, at least 15%, at least 20%, at least 30%, at least 40%, or at least 50% FFAs.

The corn oil can be processed to reduce fatty acid alkyl ester (FAAE) content or increase FFA of first fraction by the strategies mentioned above. In some aspects, the corn oil is a first fraction of corn oil separated from a corn oil by a separation operation, for example, a distillation operation or a short path evaporator, to produce the first fraction having relatively low FAAE and a second fraction having relatively high FAAE. The first fraction can include FFA added after the first fraction is separated from the corn oil. In some aspects, the first fraction has been treated with an enzyme to increase FFA content after the first fraction has been separated from the corn oil. The separation operation can include (i) adjusting the temperature of the corn oil and (ii) filtering or centrifuging the corn oil. The separation operation can also include neutralizing the corn oil and filtering or centrifuging it. The first fraction FFA content can also be increased by the aforementioned strategies.

Table 1 provides characteristics of an exemplary DCO useful herein. Table 2 provides a compositional analysis of an exemplary DCO useful herein. Along with the analytes, the methods and conditions by which the values were measured are also provided.

TABLE 1

| Exemplary DCO Specifications | |
| --- | --- |
| Free Fatty Acids (FFAs), mass % | ≤15.0 |
| Moisture (M), mass % | ≤1.0 |
| Insolubles (I), mass % | ≤0.4 |
| Unsaponifiables (U), mass % | ≤2.5 |
| MIU (Totalized), mass % | ≤3.0 |
| Iodine Value | ≥118 |
| Flash Point | >430 °F. |

TABLE 2

Compositional Analysis of Exemplary DCO

| Method | Analyte | Unit | DCO Value Range |
| --- | --- | --- | --- |
| ASTM D445 @ 25° C. | Kinematic Viscosity | cSt | 35-175 |
| ASTM D 5865-13 | Caloric Value | cal/100 g | 700-1000 |
| AOAC 2005.07 mod. | Alpha Carotene | mcg/g | 0-25 |
| AOAC 2005.07 mod. | Total Beta Carotene | mcg/g | 0-30 |
| AOAC 2005.07 mod. | Trans Beta Carotene | mcg/g | 0-20 |
| AOCS Cc 6-25 | Cloud Point | ° C. | −15-15 |
| AOCS Cc 13j-97 | 1" Lovibond Red | | 0.1-100 |
| AOCS Cc 13j-97 | 1" Lovibond Yellow | | 0.1-100 |
| AOCS Cc 10c-95 @ 20° C. | Density | g/cm^3 | 0.89-0.92 |
| AOCS Ca 17-01 | Arsenic | ppm | <0.1 |
| AOCS Ca 17-01 | Cadmium | ppm | <0.1 |
| AOCS Ca 17-01 | Calcium | ppm | 0-100 |
| AOAC 937.09 | Chlorides | % | 0.1-0.5 |
| AOCS Ca 17-01 | Lead | ppm | <0.1 |
| AOCS Ca 17-01 | Magnesium | ppm | 0-600 |
| AOCS Ca 17-01 | Manganese | ppm | 0-5 |
| Hydra IIc (AA) | Mercury | ppm | <0.1 |
| AOCS Ca 20-99 | Phosphorus | ppm | 0-300 |
| AOCS Ca 17-01 | Potassium | ppm | 0-200 |
| AOCS Ca 17-01 | Sodium | ppm | 0-600 |
| AOCS Ca 17-01 mod. | Sulfur | ppm | 0-200 |
| GC-FID | Ethyl Linoleate | mass % | 0-10 |
| GC-FID | Ethyl Linolenate | mass % | 0-3 |
| GC-FID | Ethyl Oleate | mass % | 0-5 |
| GC-FID | Ethyl Palmitate | mass % | 0-5 |
| GC-FID | Ethyl Stearate | mass % | 0-3 |
| GC-FID | Total Fatty Acid Ethyl Esters | mass % | 0-17 |
| AOCS Ce 1a-13 | Arachidic Acid | mg/g | 0-10 |
| AOCS Ce 1a-13 | Behenic Acid | mg/g | 0-5 |
| AOCS Ce 1a-13 | Eicosenoic Acid | mg/g | 0-5 |
| AOCS Ce 1a-13 | Erucic Acid | mg/g | 0-2 |
| AOCS Ce 1a-13 | Lauric Acid | mg/g | 0-1 |
| AOCS Ce 1a-13 | Lignoceric Acid | mg/g | 0-5 |
| AOCS Ce 1a-13 | Linoleic Acid + Isomers | mg/g | 400-600 |
| AOCS Ce 1a-13 | Linolenic Acid, alpha | mg/g | 0-30 |
| AOCS Ce 1a-13 | Margaric Acid | mg/g | 0-2 |
| AOCS Ce 1a-13 | Margaroleic Acid | mg/g | 0-2 |
| AOCS Ce 1a-13 | Myristic Acid | mg/g | 0-2 |
| AOCS Ce 1a-13 | Oleic Acid + Isomers | mg/g | 150-350 |
| AOCS Ce 1a-13 | Other Fatty Acids | mg/g | 0-2 |
| AOCS Ce 1a-13 | Palmitic Acid | mg/g | 90-180 |
| AOCS Ce 1a-13 | Palmitoleic Acid | mg/g | 0-3 |
| AOCS Ce 1a-13 | Stearic Acid | mg/g | 50-300 |

TABLE 2-continued

Compositional Analysis of Exemplary DCO

| Method | Analyte | Unit | DCO Value Range |
|---|---|---|---|
| AOCS Ce 1a-13 | Tetracosenoic Acid | mg/g | 0-2 |
| AOCS Cc 9a-48 | Flash Point | ° F. | 400-500 |
| AOCS Ca 14-56 | Glycerol | % | 0.0-0.5 |
| AOCS Cd 11c-93 | Diglycerides | % | 0-10 |
| AOCS Cd 11c-93 | Monoglycerides | % | 0-2 |
| AOCS Cd 11c-93 | Triglycerides | % | 65-90 |
| AOCS Ca 3a-46 | Insolubles | % | 0.0-0.5 |
| AOCS Cd 1d-92 | Iodine | | 110-130 |
| AOCS Ca 2e-84 | Moisture (K/F) | % | 0-2 |
| AOCS Cd 12b-92 | OSI | hours | 0-15 |
| AOCS Cd 18-90 | p-Anisidine Value | | 0-200 |
| AOCS Cd 8b-90 | Peroxide | meq/kg | 0-200 |
| ASTM D97 | Pour Point | ° C. | −15-10 |
| AOCS Cc 9a-48 | Smoke Point | ° F. | 150-500 |
| AOCS Cc 17-95 | Soap as Sodium Oleate | ppm | 0-10000 |
| USP 40/NF 35 | 24-methylene-cholesterol | % w/w | 0.0-0.5 |
| USP 40/NF 35 | Brassicaserol | % w/w | 0.0-0.5 |
| USP 40/NF 35 | Campestanol | % w/w | 0.0-0.5 |
| USP 40/NF 35 | Campesterol | % w/w | 0-1 |
| USP 40/NF 35 | Cholesterol | % w/w | 0.0-0.5 |
| USP 40/NF 35 | Clerosterol | % w/w | 0.0-0.5 |
| USP 40/NF 35 | Sitostanol | % w/w | 0.0-0.5 |
| USP 40/NF 35 | Stigmasterol | % w/w | 0-1 |
| USP 40/NF 35 | β-sitosterol | % w/w | 0-2 |
| USP 40/NF 35 | Δ-5,23-stigmastadienol | % w/w | 0.0-0.5 |
| USP 40/NF 35 | Δ5,24-stigmasadienol | % w/w | 0.0-0.5 |
| USP 40/NF 35 | Δ-5-avenasterol | % w/w | 0-1 |
| USP 40/NF 35 | Δ-7-Avenasterol | % w/w | 0-1 |
| USP 40/NF 35 | Δ-7-Campesterol | % w/w | 0.0-0.5 |
| USP 40/NF 35 | Δ-7-Stigmastenol | % w/w | 0-1 |
| USP 40/NF 35 | Total Sterols | % w/w | 0-2 |
| AOCS Ce 8-89 | Total Tocopherols | ppm | 0-2000 |
| AOCS Ce 8-89 | Total Tocotrienols | ppm | 0-1000 |
| AOCS Ce 8-89 | Total Vitamin E | ppm | 0-2000 |
| AOCS Ce 8-89 | α-tocopherol | ppm | 0-1000 |
| AOCS Ce 8-89 | α-Tocotrienol | ppm | 0-500 |
| AOCS Ce 8-89 | β-tocopherol | ppm | 0-20 |
| AOCS Ce 8-89 | β-Tocotrienol | ppm | 0-100 |
| AOCS Ce 8-89 | γ-tocopherol | ppm | 0-1000 |
| AOCS Ce 8-89 | γ-Tocotrienol | ppm | 0-500 |
| AOCS Ce 8-89 | δ-tocopherol | ppm | 0-500 |
| AOCS Ce 8-89 | δ-Tocotrienol | ppm | 0-100 |
| AOCS Ce 1e-91 | Trans Fat | % | 0-1 |
| AOCS Ca 6a-40 | Unsaponifiables | % | 0-3 |

A rubber formulation (also referred to herein as the "rubber composition") typically contains an elastomer (e.g. styrene-butadiene rubber (SBR), ethylene propylene diene monomer (EPDM), natural rubber (NR), nitrile rubber (NBR), etc.) and a process oil.

Different elastomers are contemplated herein, depending on the end use or the desired properties of the rubber formulation: 1,2-butadiene rubber, butyl rubber (IIR), halogenated butyl rubber, acrylonitrile-butadiene rubber (NBR), acrylonitrile-styrene-butadiene copolymer rubber, chloroprene rubber, ethylene-propylene copolymer rubber, styrene-isoprene copolymer rubber, styrene-isoprene-butadiene copolymer rubber, isoprene-butadiene copolymer rubber, chlorosulfonated polyethylene rubber, acrylic rubber, epichlorohydrine rubber, silicone rubber, urethane rubber, and mixtures thereof, alone or in combination of two or more.

Other materials can also be included in the rubber formulation, including for example, filler (e.g. carbon black, silica), activator (e.g. zinc oxide), fatty acid (e.g. stearic acid), antioxidants (e.g. TMG), curative (e.g. sulfur), and accelerator (e.g. TBBS, TMTD, DPG). A filler can be present in the formulation in an about from about 20 PHR to about 100 PHR. An activator can be present in the formulation in an amount from about 1 PHR to about 10 PHR. An antioxidant can be present in an amount from about 0.1 PHR to about 5 PHR. A curative can be present in an amount from about 0.1 PHR to about 3.0 PHR, or about 1.0 PHR to about 2.0 PHR. An accelerator can be present in an amount from about 0.1 PHR to about 3.0 PHR.

Additional ingredients may be included to adjust the properties of the rubber compound, for example, to change how the rubber vulcanizes (power consumption, scorch time, cure time, etc.) or to adjust the final rubber compound characteristics.

As described herein, the process oil comprises distiller's corn oil, in whole or in part, for example, corn oil extracted from whole stillage after fermentation or separated from fermentation residue. Exemplary corn oil includes post fermentation distiller's corn oil or post distillation distiller's corn oil. Distiller's corn oil can be added to the rubber formulation in an amount from about 2 to about 40 parts per hundred rubber (PHR), for example, about 2 to about 20 PHR, about 2 to about 10 PHR, about 20 to about 40 PHR, about 30 to about 40 PHR, about 10 to about 30 PHR, or about 20 to about 30 PHR, and any ranges falling therein. The distiller's corn oil can have an iodine value of at least 100 and at most 200.

In addition, the distiller's corn oil can contain a low fatty acid alkyl esters (e.g. fatty acid ethyl esters), for example less than about 16%, or less than about 10%, or less than about 5%, or less than about 2%, or less than about 1%, or less than about 0.5% free fatty acid alkyl ester.

Other process oils having similar or synergetic properties can be used in combination with the distiller's corn oil, including for example, other vegetable oils such as soybean oil, olive oil, cotton seed oil, rape seed oil, corn oil, sesame oil, safflower oil, linseed oil, etc. Likewise, it can be desirable to add aromatic oil, naphthenic oil and/or paraffin oil in addition to the distiller's corn oil.

Production of the rubber compound can occur according to known methods. See Example 2 and Table 4 below. Master batch mixing allows proper mixing and distribution of each component at high temperature before the curative is added. A typical master batch mixing begins with a temperature sweep at 220° F., followed by a 280° F. sweep, and drop at 300° F. A final pass mix is performed similar to master batch mixing except that the sulfur curative is added. A typical final pass mix is carried out by mixing at 180° F., then dropping once the temperature reaches 220° F. A typical vulcanization is carried out when temperature of the final formulation reaches 290° F. or higher. A typical process to drive vulcanization is at 320° F. for 17 minutes.

Slight differences in production are contemplated, such as performing the compounding in one step or adjusting one or more of the temperature settings.

A process for formulating rubber can comprise: (i) combining an elastomer with a process oil comprising corn oil having an FFA content greater than 4% w/w of the total corn oil and FAAE content less than 16% w/w of the total corn oil, a filler, an activator, and an antioxidant; (ii) mixing the components from (i) at a temperature of at least about 210° F. to form a master batch; (iii) adding a sulfur curative to the master batch; and (iv) mixing the sulfur curative and master batch at a temperature of at least about 180° F. to form a final pass mix. The process can further comprise (v) vulcanizing the final pass mix at a temperature of at least about 290° F. for at least 10 minutes.

Figure 9:
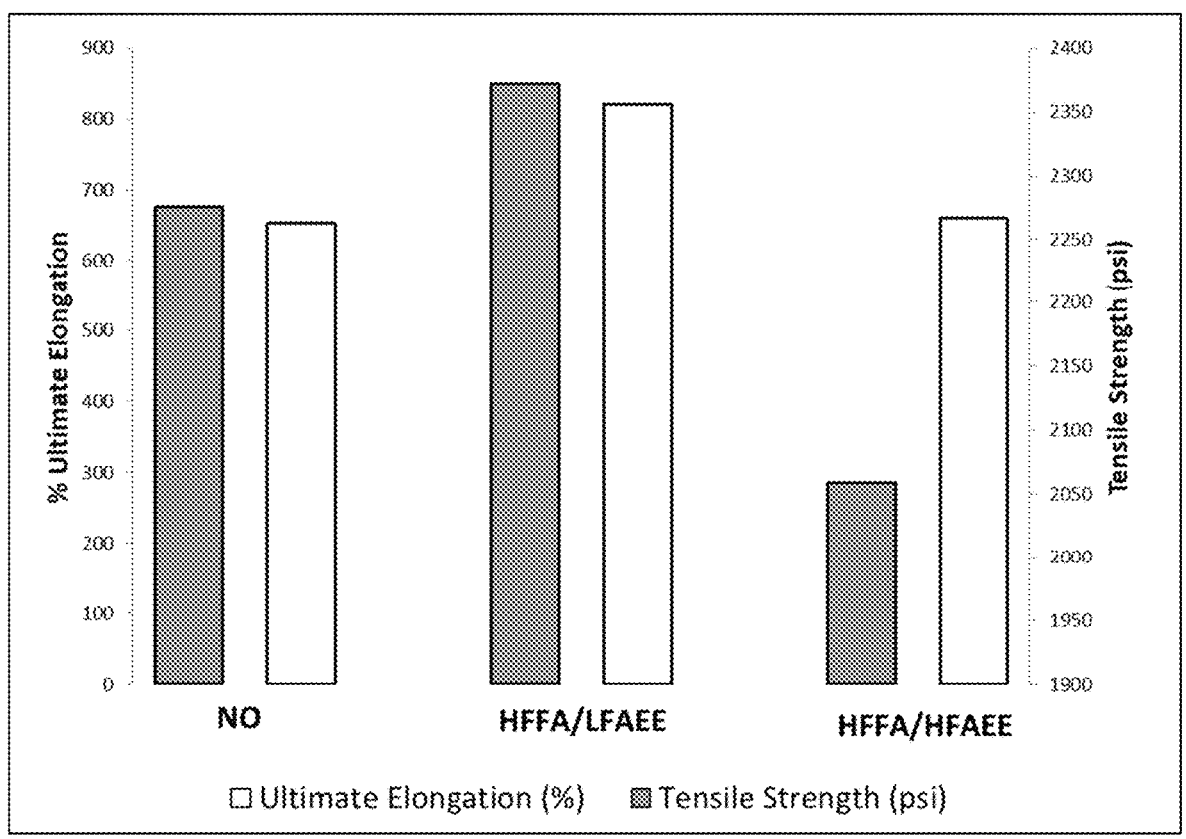
FIG. 9 shows original tensile strength and ultimate elongation of rubber compounds made with high free fatty acid and high or low fatty acid ethyl ester compositions compared to naphthenic oil.
Figure 10:
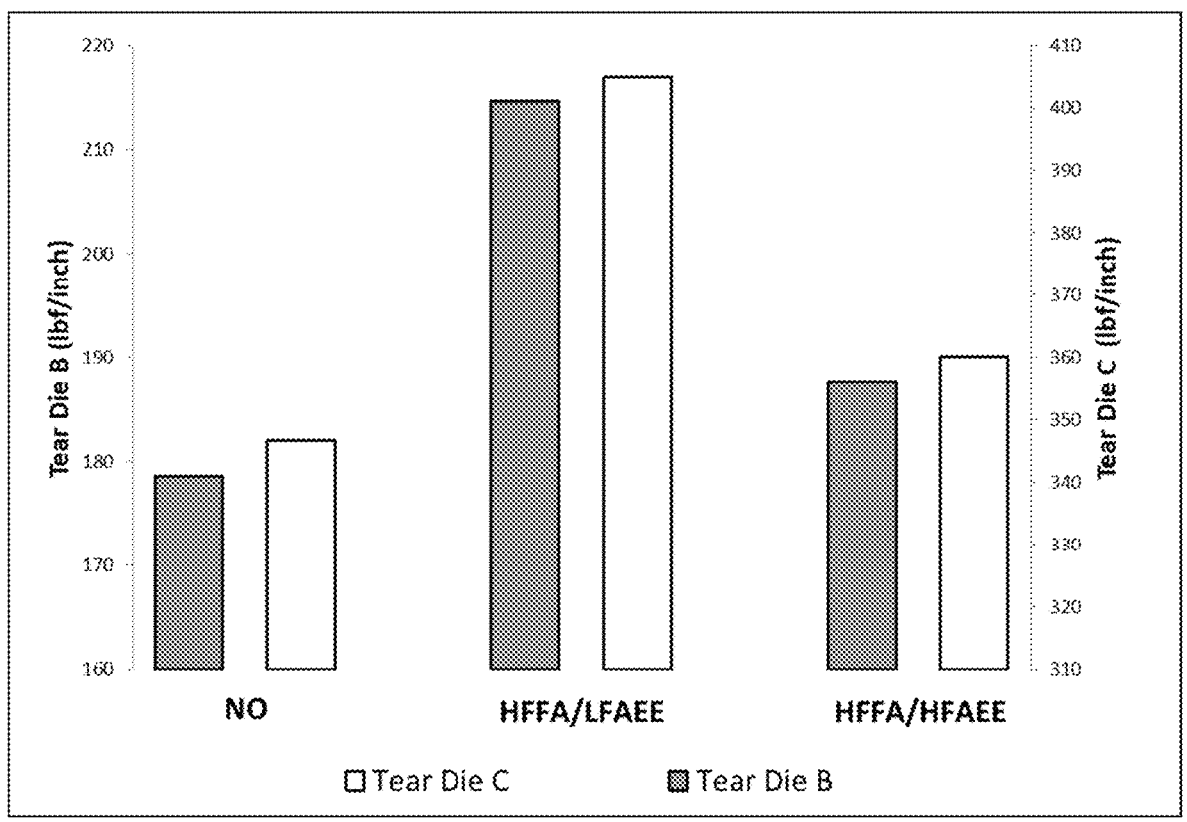
FIG. 10 shows tear resistance of rubber compounds made with high free fatty acid and high or low fatty acid ethyl ester compositions compared to naphthenic oil.

Ultimately, incorporating DCO improves the performance of the rubber compounds in a number of evaluations including: tensile strength, elongation, modulus, heat aging, tear properties, DIN abrasion, and DeMattia flex resistance (FIGS. 1-7). FIGS. 9 and 10 as well as Tables 6 and 7 indicate that DCO compositions with high free fatty acid (FFA) and low FAAE, for example, low fatty acid ethyl ester (FAEE), give the best performance results when used as process oils.

Depending on the chosen elastomer and specific formulation, the resulting rubber compound can be used for various applications. SBR rubber compounds are characterized by abrasion and heat resistance as well as low temperature flexibility. SBR rubber is typically used in pneumatic tires and conveyor belts. EPDM rubber compounds are characterized by resistance to oxygen, UV rays, and water damage. EPDM rubber is used in roofing membranes, hoses, seals, etc.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims.

EXAMPLES

The following examples are provided such that those of ordinary skill in the art have a complete disclosure and description of how to implement the methods disclosed herein. Efforts have been made to ensure accuracy with respect to numbers used (e.g., amounts, temperature, etc.) but some experimental errors and deviations should be accounted for. Unless indicated otherwise, parts are by weight, molecular weight is average molecular weight, and pressure is at or near atmospheric.

Example 1: Exemplary Rubber Formulations

Five rubber formulations using distiller's corn oil, naphthenic oil, and soybean oil were prepared according to materials listed in Table 3. Inclusions of the distiller's corn oil and soybean oil were selected to equalize the durometer hardness of rubber compound made with Calsol 8240 (naphthenic oil). The rest of the components (SBR 1502, N550, zinc oxide, stearic acid, TMQ, sulfur RM, TBBS, and TMTD) were kept consistent with all the samples. The inclusion of each component is based upon parts per hundred rubber (PHR).

TABLE 3

Materials for Rubber Formulations

| Raw Material Type | Trade Name | NO | DCO 1 | DCO 2 | DCO 3 | SBO |
|---|---|---|---|---|---|---|
| Elastomer | SBR 1502 | 100 | 100 | 100 | 100 | 100 |
| Filler | Cabon black N550 | 50 | 50 | 50 | 50 | 50 |
| NO | Calsol 8240 | 25 | | | | |
| DCO 1 | — | | 20 | | | |
| DCO 2 | — | | | 20 | | |
| DCO 3 | — | | | | 20 | |
| SBO | — | | | | | 20 |
| Activator | Zinc Oxide | 5 | 5 | 5 | 5 | 5 |
| Fatty acid | Stearic acid | 1.5 | 1.5 | 1.5 | 1.5 | 1.5 |
| Antioxidant | TMQ | 1 | 1 | 1 | 1 | 1 |
| Curative | Sulfur TM | 0.8 | 0.8 | 0.8 | 0.8 | 0.8 |
| Accelerator | TBBS | 1.5 | 1.5 | 1.5 | 1.5 | 1.5 |
| Accelerator | TMTD | 0.5 | 0.5 | 0.5 | 0.5 | 0.5 |

Abbreviations are as follows: NO—naphthenic oil; DCO 1/2/3—distiller's corn oil samples 1/2/3; and SBO—soybean oil.

Example 2: Mixing Data of Rubber Formulations

The power consumption, mixing speed, temperature, and time for both master batch and final mixes are listed. For the master batch mixes, SBR and one half of the carbon black N550 were added to the other components (except the sulfur curative) and allowed to mix for one minute at which point the remainder of the carbon black N550 was added. A temperature sweep at 220° F. and 280° F. were carried out followed by drop at 300° F. Final pass mix was formulated with the material from the master batches along with addition of the sulfur curative. The samples were mixed at 180° F., then dropped once the temperature reached 220° F. Vulcanization of the compounds was carried out at 320° F. for 17 minutes in the slab or plaque molds for the corresponding tests.

TABLE 4

Mixing Data of Rubber Formulations

| Batch | Time (min) | Temperature (° F.) | Power (HP) | Speed (rpm) | Average Power (HP) | Integrated Power (HP * min) |
|---|---|---|---|---|---|---|
| Master Batch | | | | | | |
| NO | 7.70 | 300 | 16.4 | 109.2 | 16.48 | 114.93 |
| DCO 1 | 5.47 | 300 | 14.27 | 101.52 | 14.35 | 77.33 |
| DCO 2 | 5.15 | 300 | 14.12 | 99.84 | 14.05 | 71.30 |
| DCO 3 | 5.37 | 300 | 12.17 | 95.08 | 13.09 | 69.81 |
| SBO | 4.98 | 300 | 7.34 | 67.38 | 10.35 | 62.05 |
| Final Batch | | | | | | |
| NO | 1.55 | 220 | 9.44 | 66.32 | 9.4 | 18.96 |
| DCO 1 | 1.75 | 221 | 7.66 | 55.83 | 8.55 | 19.13 |
| DCO 2 | 1.78 | 220 | 8.36 | 57.95 | 8.95 | 18.97 |
| DCO 3 | 1.65 | 222 | 9.75 | 62.67 | 9.67 | 18.43 |
| SBO | 1.47 | 220 | 8.17 | 56.52 | 8.88 | 15.94 |

The power consumption, mixing speed, temperature, and time for both master batch and final mixes are listed in Table 4. For the master batch mixes, SBR and one half of the carbon black N550 were added to the other components (except the sulfur curative) and allowed to mix for one minute at which point the remainder of the carbon black N550 was added. A temperature sweep at 220° F. and 280° F. were carried out followed by drop at 300° F. Final pass mix was formulated with the material from the master batches along with addition of the sulfur curative. The samples were mixed at 180° F. and dropped once the temperature reached 220° F.

Example 3: Vulcanization Using Rotorless Cure Meter

Rubber formulations were allowed to cure in a Montech upgraded MDR-2000 for 30 minutes at 350° F. with 0.50 arc according to ASTM D 5289. The following are listed in Table 5: the minimum (ML) and maximum torque (MH) measured in pounds force per inch, cure times (T50, T90), and scorch time (TS1) measured in minutes.

TABLE 5

Vulcanization Using Rotorless Cure Meter

| Sample Name | Min. Torque, ML, lbf-in | Cure Time, T50, min | Cure Time, T90, min | Scorch Time, TS1, min | Max. Torque, MH, lbf-in |
|---|---|---|---|---|---|
| NO | 0.63 | 6.93 | 12.22 | 5.24 | 7.29 |
| DCO 1 | 0.77 | 6.36 | 11.67 | 4.83 | 7.59 |
| DCO 2 | 0.75 | 6.70 | 12.38 | 5.05 | 7.77 |
| DCO 3 | 0.79 | 6.56 | 12.12 | 4.91 | 7.74 |
| SBO | 0.77 | 6.30 | 11.04 | 4.89 | 7.25 |

Results demonstrate rubber formulations comprising vegetable oil have higher minimum and maximum torque, shorter cure times, and shorter scorch times.

Example 4: Characterizing Original Rubber Formulations Containing Vegetable Oils The Shore A Durometer points, tensile strength (psi), ultimate elongation (%), and modulus (50%, 100%, 200%, and 300%) were measured according to ASTM D412 and ASTM D2240e1 and are listed in Table 6 and shown in FIG. 1.

TABLE 6

Rubber Compound Properties

| | Sample Name | | | | |
|---|---|---|---|---|---|
| | NO | DCO 1 | DCO 2 | DCO 3 | SBO |
| Shore A Durometer (points) | 51 | 52 | 52 | 52 | 52 |
| Tensile Strength (psi) | 2481 | 2346 | 2467 | 2566 | 2404 |
| Ultimate Elongation (%) | 670 | 678 | 721 | 746 | 741 |
| 50% Modulus (psi) | 122 | 116 | 118 | 119 | 116 |
| 100% Modulus (psi) | 204 | 199 | 200 | 193 | 185 |
| 200% Modulus (psi) | 517 | 523 | 526 | 491 | 451 |
| 300% Modulus (psi) | 946 | 942 | 941 | 889 | 813 |

Durometer indicates the overall hardness of the rubber compounds measured in points. The PHR inclusion of the vegetable oils and naphthenic oil were adjusted to control for similar hardness level of each produced rubber compound. As shown in Table 6, the durometer hardness levels of each sample are nearly identical. The tensile strength and ultimate elongation differences of each sample are shown in FIG. 1. The data indicate that the tensile strength and ultimate elongation of the rubber compounds produced from the various DCOs vary greatly. Most of the vegetable oils show better tensile and elongation properties except DCO 1 (inferior tensile and elongation) and SBO (inferior tensile). The DCO 3 sample shows the best overall ultimate elongation and tensile strength outperforming NO which is typically utilized in rubber compounding. The various vegetables also demonstrate changes in the modulus as compared to NO which may be favorable for some rubber applications.

The tensile strength is measured as the maximum force incurred before breaking.

The ultimate elongation is the maximum length stretched over the original length measured as a percent.

Figure 2:
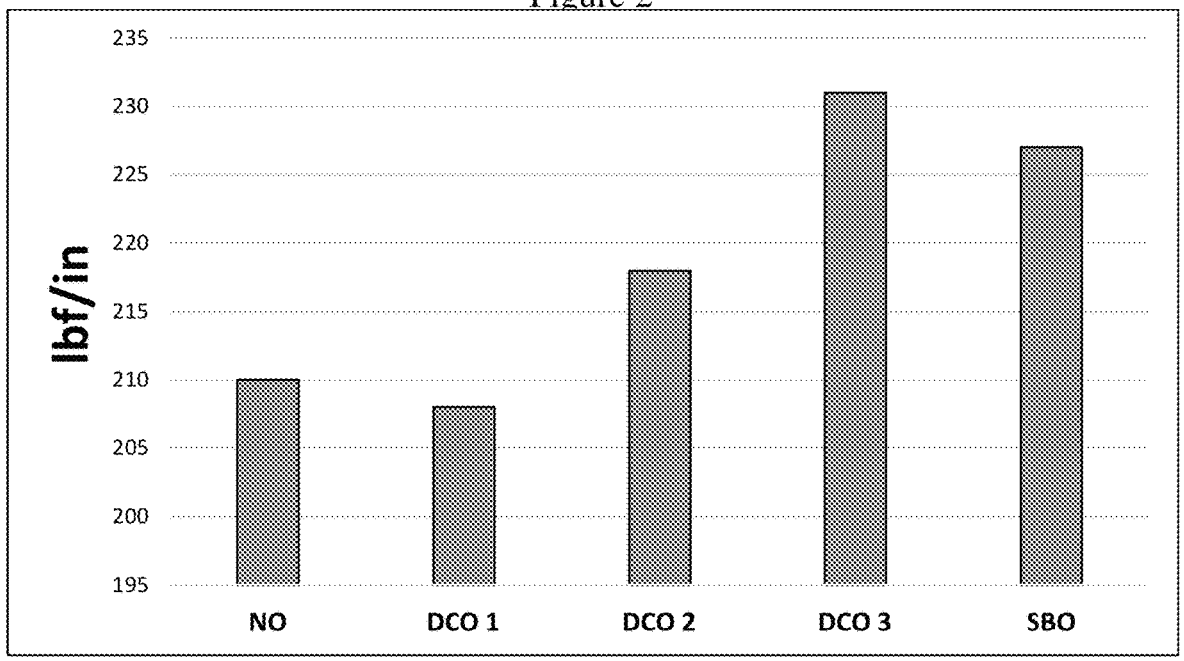
FIG. 2 shows the tear resistance measured in pounds of force per inch (lbf/in) according to ASTM D624-00 (2012), DIE C at 20 in/min. The tear resistance is the force required to initiate a tear in the rubber compounds.

Tear resistance is the force required to initiate a tear in a piece of rubber and is measured in pounds of force per inch (lbf/in) according to ASTM D624-00 (2012). FIG. 2 shows the tear resistance of the five rubber formulations. Rubber formulations containing DCO, on average, exhibit higher tear resistance than the rubber formulation containing NO.

Example 5: Properties of Heat-Aged Rubber Compounds Containing Distiller's Corn Oil Rubber compounds were heat-aged at 212° F. for 70 hours in an air oven per ASTM D573. Property tests were performed as previously mentioned.

Figure 3:
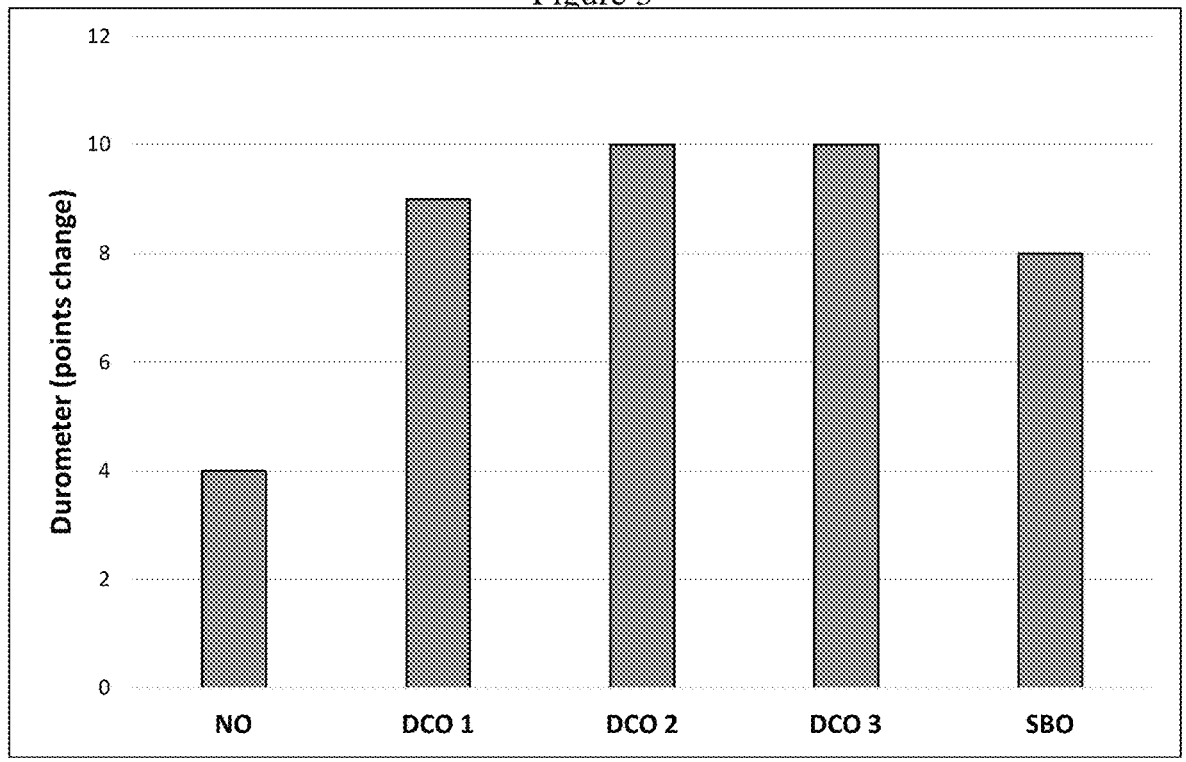
FIG. 3 shows the change in durometer points for each aged rubber compound compared to the original.
Figure 4:
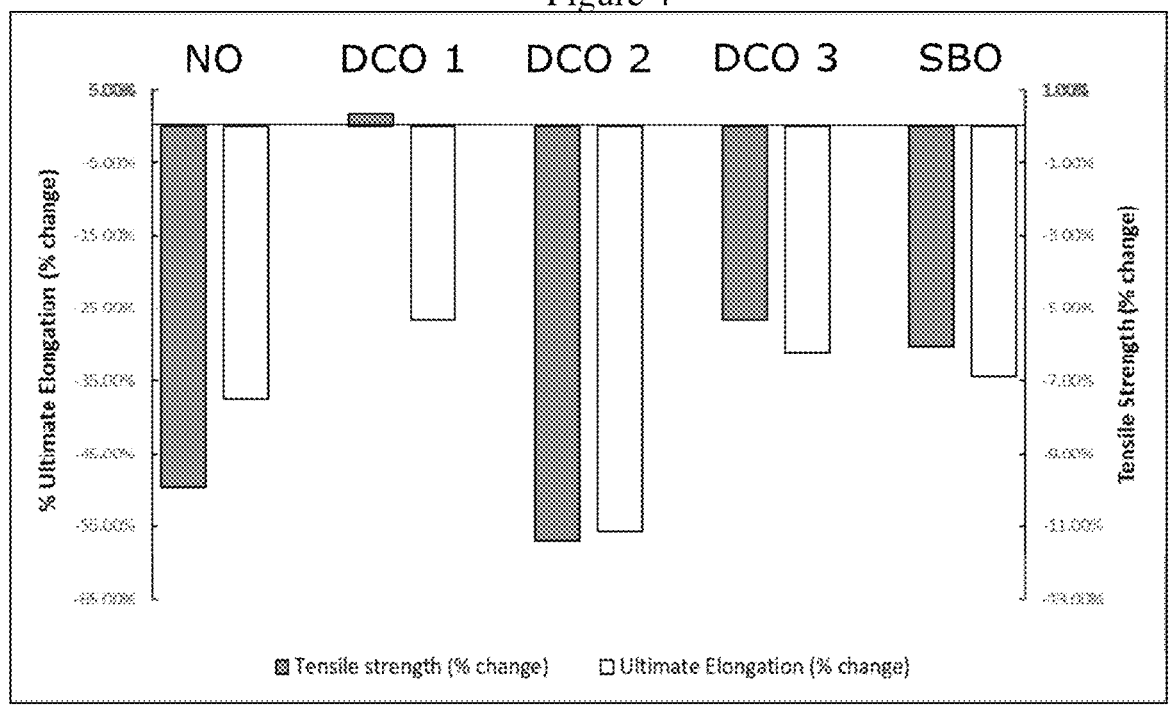
FIG. 4 shows the percent change in tensile strength and ultimate elongation for each aged rubber compound compared to the original.

FIG. 3 shows that, relative to the original formulation, DCO formulated rubber exhibited a 9-10 point increase in hardness while NO formulated rubber exhibited a 4 point increase in hardness. However, the increase in hardness is within typical values observed in rubber compounding. Moreover, the increase in hardness due to aging does not appear to equally result in poorer performance in tensile or elongation properties as shown in FIG. 4.

In addition, percent change in tensile strength and ultimate elongation were determined for each aged rubber compound compared to the original. FIG. 4 shows similar changes in ultimate elongation and tensile strength between NO and the other vegetable oils. In fact, most vegetable oils (except DCO 2) appear to retain tensile and elongation properties better than NO.

Example 6: Compression Tested Rubber Formulations

Rubber compounds were compressed for 22 hours at 100° C. at 25% deflection and allowed a half hour for recovery.

Figure 5:
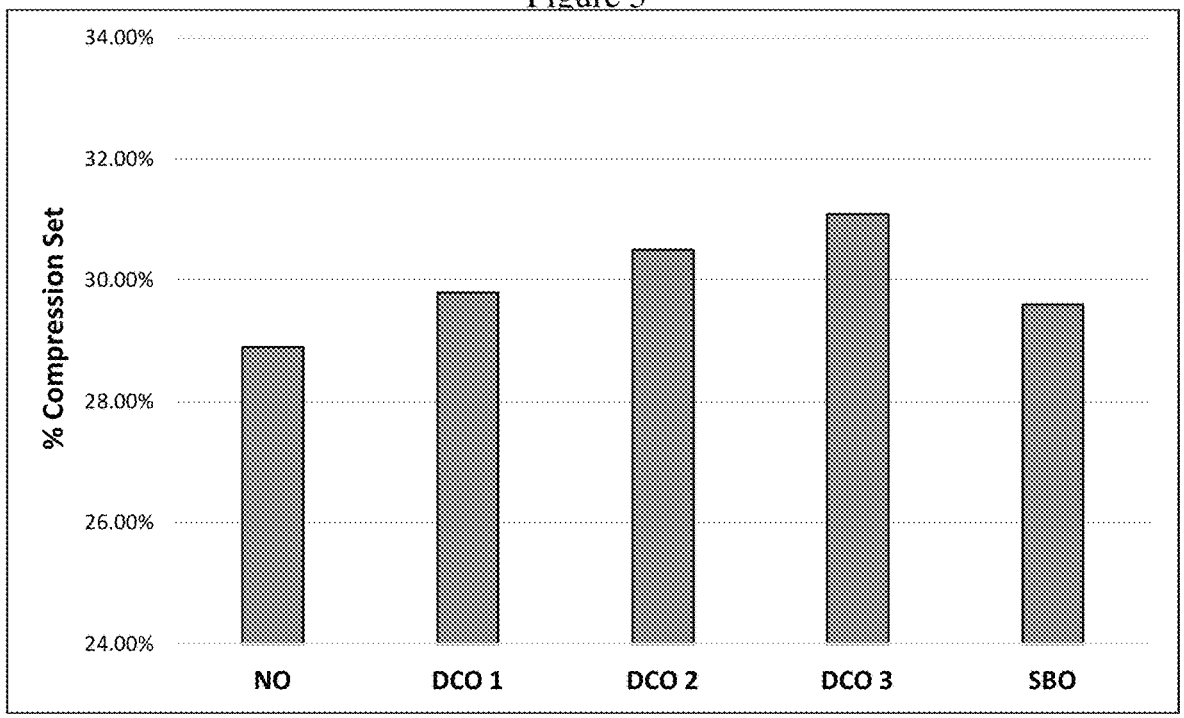
FIG. 5 provides the percent compression for the rubber compounds, and is calculated as the final thickness over the original thickness to assess any permanent deformation.

The percent compression was calculated as the final thickness over the original thickness to assess any permanent deformation. Rubber formulations containing DCO exhibited between 29% and 31% compression set, which was greater than both NO and SBO containing formulations as shown in FIG. 5.

Example 7: DIN Abrasion Testing

Figure 6:
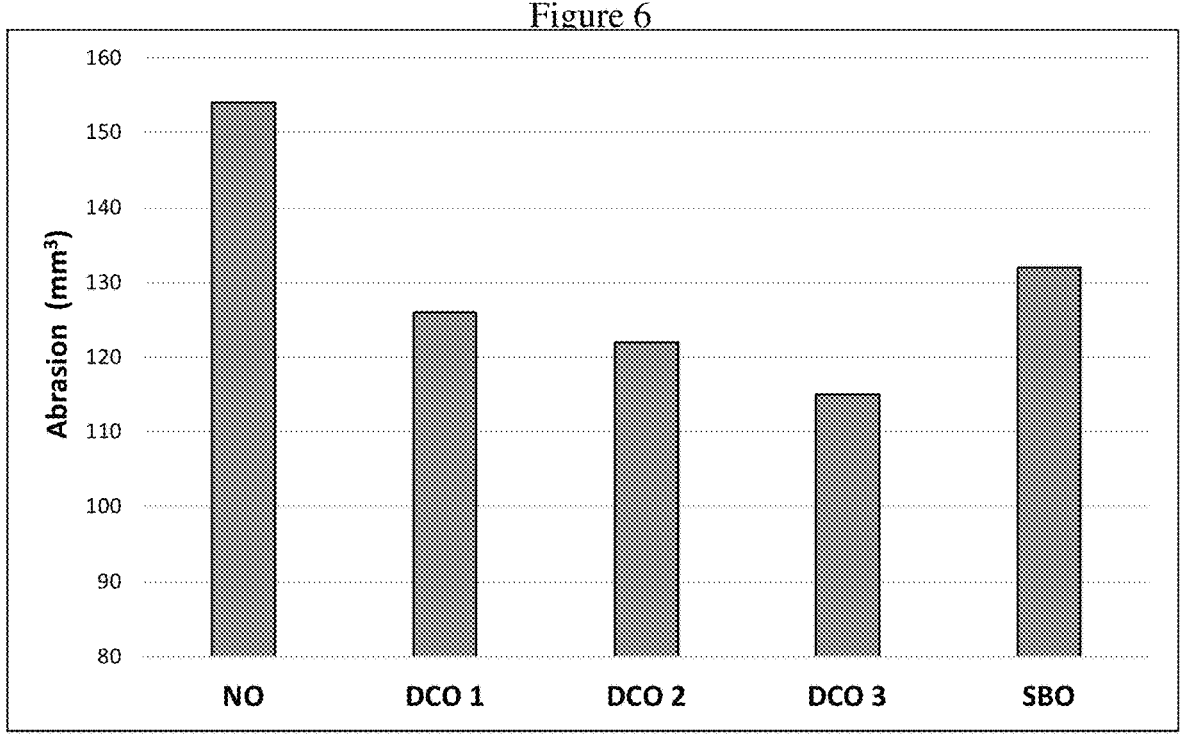
FIG. 6 provides DIN abrasion results, i.e. volume of abrasion ($mm^3$) lost according to DI 53 516/ASTM D5963 is shown. The volumetric loss of rubber specimens is measured after exposure to an abrasive rotating cylinder.
Figure 7:
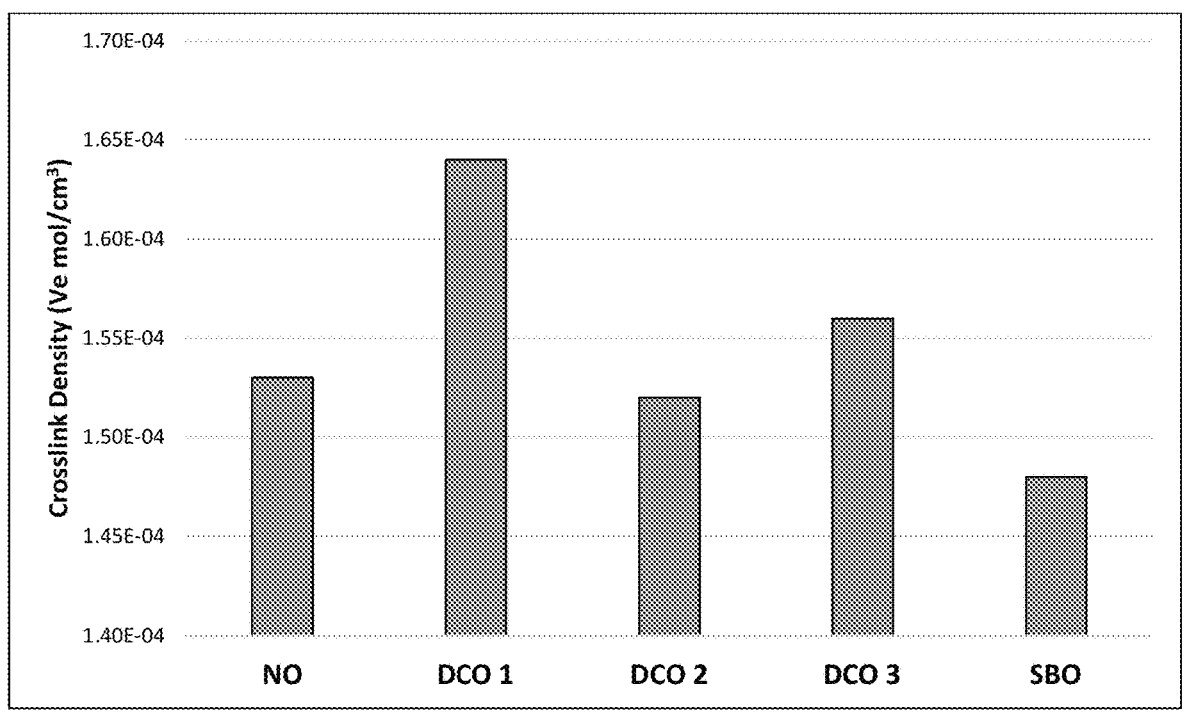
FIG. 7 provides the crosslink density of the rubber compounds assessed according to ARDL 3135. The samples were immersed in toluene for 24 hours at room temperature. The crosslink density (Ve) was calculated according to the Flory-Rehner equation using the polymer-interaction constant for polychloroprene in toluene (0.35).

The volumetric loss of rubber formulations was measured after exposure to an abrasive rotating cylinder. FIG. 6 demonstrates the volume of abrasion ($mm^3$) lost according to DI 53 516/ASTM D5963, in which the three DCO containing rubber formulations exhibit reduced loss relative to NO and SBO containing rubber formulations.

Example 8: Crosslink Density Testing

The crosslink density of the rubber compounds were assessed according to ARDL 3135. The samples were immersed in toluene for 24 hours at room temperature. The crosslink density (Ve) was calculated according to the Flory-Rehner equation using the polymer-interaction constant for polychloroprene in toluene (0.35). See FIG. 7. All process oils used resulted in rubber compounds with similar crosslink density.

Example 9: Compositional Analysis of Distiller's Corn Oil and Soybean Oil

Composition of DCO1, DCO2, DCO3, and SBO were determined. Compositional analysis includes free fatty acid, fatty acid ethyl ester, iodine value, fatty acid profile, and mineral profile. See Table 7.

Figure 8:
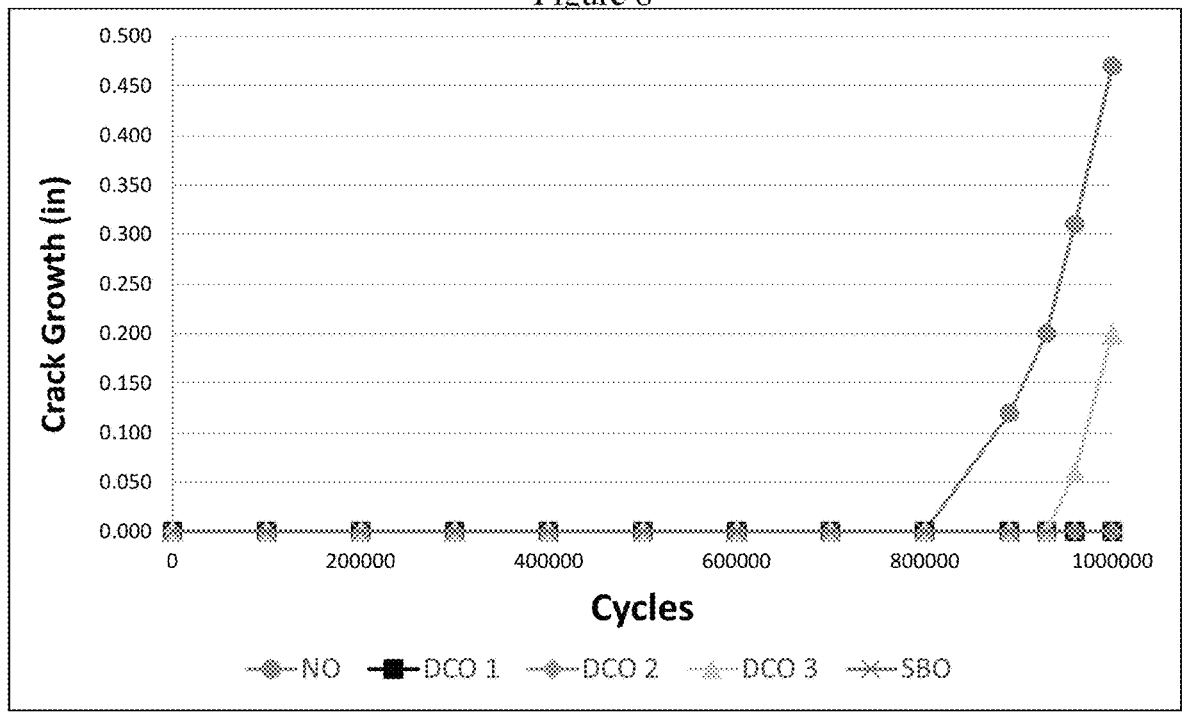
FIG. 8 provides the Demattia flex of the rubber compounds according to ASTM D430 at 300 CPM on unpierced specimens tested up to 1,000,000 cycles. The samples were exposed to repetitive flexing and the length of any formed cracks were measured throughout the testing.

The Demattia flex of the rubber compounds was measured according to ASTM D430 at 300 CPM on unpierced specimens tested up to 1,000,000 cycles. The samples were exposed to repetitive flexing and the length of any formed cracks were measured throughout the testing. As shown in FIG. 8, no cracks were formed in DCO containing formulations until 900,000 cycles, and the crack growth was minimal relative to crack growth of the NO containing formulation at 1,000,000 cycles.

TABLE 7

Composition of DCOs and SBO

| | Sample Name | | | |
|---|---|---|---|---|
| Component | DCO1 | DCO2 | DCO3 | SBO |
| Free Fatty Acid (% w/w) | 4.89% | 7.88% | 10.99% | 1.35% |
| Fatty Acid Ethyl Ester (% w/w) | 15.84% | 10.45% | 3.59% | 0.28% |
| Iodine Value | 121.99 | 121.5 | 120.9 | 128.53 |
| Fatty Acid Profile[a] | | | | |
| Palmitic | 13.2% | 14.7% | 14.7% | 13.3% |
| Stearic | 1.9% | 2.1% | 2.1% | 5.6% |
| Oleic | 27.6% | 29.6% | 29.1% | 22.3% |
| Linoleic | 55.9% | 52.4% | 52.9% | 50.2% |
| Linolenic | 1.4% | 1.2% | 1.1% | 8.5% |
| Total | 100.0% | 100.0% | 100.0% | 100.0% |
| Mineral Profile | | | | |
| Calcium | 2.3 | 27 | <1 | 34 |
| Magnesium | 7.6 | 198 | 1 | 41 |

TABLE 7-continued

Composition of DCOs and SBO

| | Sample Name | | | |
|---|---|---|---|---|
| Component | DCO1 | DCO2 | DCO3 | SBO |
| Phosphorous | 5.5 | 127 | 3 | 453 |
| Potassium | 2.5 | 40 | 4 | 243 |
| Sodium | 1.5 | 110 | 4 | <2 |

[a]Percentage of each fatty acid based upon peak area obtained via GC-FID

Example 10: Compositional Analysis of Distiller's Corn Oil with High or Low Fatty Acid Ethyl Esters Composition of high free fatty acid/low fatty acid ethyl ester (HFFA/LFAEE) and high free fatty acid/high fatty acid ethyl ester (HFFA/HFAEE) distiller's corn oils were also determined. Compositional analysis includes free fatty acid (FFA) and fatty acid ethyl ester (FAEE) content. See Table 8.

TABLE 8

Composition of DCOs with High Free Fatty Acid and High or Low Fatty Acid Ethyl Ester Compositions

| | Sample Name | |
|---|---|---|
| Component | HFFA/LFAEE | HFFA/HFAEE |
| Free Fatty Acid (% w/w) | 59.50% | 42.04% |
| Fatty Acid Ethyl Ester (% w/w) | 0.17% | 37.98% |

Table 9 provides the Demattia flexibility of DCO rubber formulations containing high free fatty acid and high/low fatty acid ethyl ester formulations. The compositions containing the low fatty ethyl esters performed better than the NO formulation and the DCO formulation with high fatty acid ethyl ester.

TABLE 9

Demattia Flexibility of Rubber Compounds Made with High Free Fatty Acid and High or Low Fatty Acid Ethyl Ester Compositions Compared to Naphthenic Oil

| Sample | Result |
|---|---|
| NO | 1 of 3 went to 1,000,000 cycles |
| HFFA/LFAEE | 3 of 3 went to 1,000,000 cycles |
| HFFA/HFAEE | 1 of 3 went to 1,000,000 cycles |

Example 11: Testing of Distiller's Corn Oil Rubber Formulations with High or Low Fatty Acid Ethyl Esters Original tensile strength, ultimate elongation, and tear resistance was determined for rubber formulations made with high free fatty acid and high or low fatty acid ethyl ester compositions compared to NO rubber formulations. See FIG. 9, which shows using the higher FFA and lower FAEE DCO results in a rubber compound with improved tensile strength and ultimate elongation compared to NO. The higher FAEE sample result indicates that FAEE contribute to worsening tensile properties (possibly elongation properties as well), which is consistent with the aforementioned performance differences between DCO samples 1 through 3. Likewise, FIG. 10 demonstrates DCO with higher FFA and lower FAEE contributes to exceptional tear resistance relative to NO rubber formulations.

What is claimed is:

1. A rubber composition comprising:
   an elastomer; and
   a process oil comprising distiller's corn oil having a free fatty acid content greater than 20% w/w of the total distiller's corn oil and a fatty acid alkyl ester content less than 16% w/w of the total distiller's corn oil.

2. The rubber composition of claim 1, comprising about 2 to about 70 parts distiller's corn oil per hundred rubber (PHR).

3. The rubber composition of claim 1 wherein the elastomer is styrene-butadiene rubber (SBR), ethylene propylene diene monomer (EPDM), natural rubber (NR), nitrile rubber (NBR), a component of natural rubber, polybutadiene or mixtures thereof.

4. The rubber composition of claim 1, wherein the distiller's corn oil is post distillation distiller's corn oil.

5. The rubber composition of claim 1, wherein the distiller's corn oil is processed during fermentation to decrease fatty acid alkyl ester content.

6. The rubber composition of claim 1, wherein the distiller's corn oil is exposed to heat in the presence of water.

7. The rubber composition of claim 1, wherein the distiller's corn oil is exposed to one or more enzymes in the presence of water.

8. The rubber composition of claim 1 wherein the distiller's corn oil is exposed to acid in the presence of water to increase free fatty acid content.

9. The rubber composition of claim 1, wherein the distiller's corn oil is the separation product of a post-fermentation emulsion exposed to a pH of less than 8 to increase the free fatty acid content in the distiller's corn oil.

10. The rubber composition of claim 1, wherein the distiller's corn oil is exposed to a caustic to saponify the distiller's corn oil, then exposed to an acid to generate free fatty acid.

11. The rubber composition of claim 1, further comprising one or more of:
    one or more fillers; one or more activators; one or more antioxidants; one or more curatives; and one or more accelerators.

12. The rubber composition of claim 1, comprising: between 20 PHR and 100 PHR filler; between 1 PHR and 10 PHR activator; between 0.1 PHR and 5 PHR antioxidant; between 0.1 and 2.0 PHR curative; and between 0.1 and 3.0 PHR accelerator.

13. The rubber composition of claim 1, wherein the distiller's corn oil is post fermentation distiller's corn oil.

14. The rubber composition of claim 13, wherein the distiller's corn oil is post fermentation distiller's corn oil processed to decrease fatty acid alkyl ester content.

15. The rubber composition of claim 1, wherein the distiller's corn oil includes added free fatty acid.

16. The rubber composition of claim 15, wherein the free fatty acid is stearic acid, palmitic acid, oleic acid, linoleic acid, linolenic acid, and mixtures thereof.

17. The rubber composition of claim 1, wherein the distiller's corn oil has been processed to reduce fatty acid alkyl ester.

18. The rubber composition of claim 17, wherein the distiller's corn oil is a first fraction obtained by a separation operation to produce the first fraction having relatively low fatty acid alkyl ester and a second fraction having relatively high fatty acid alkyl ester.

19. The rubber composition of claim 18, wherein the first fraction includes free fatty acid added after the first fraction separated from the distiller's corn oil.

20. The rubber composition of claim 18, wherein the first fraction has been treated with an enzyme to increase free fatty acid content after the first fraction has been separated from the distiller's corn oil.

21. The rubber composition of claim 18, wherein the separation operation includes a distillation operation.

22. The rubber composition of claim 18, wherein the separation operation includes a short path evaporator.

23. The rubber composition of claim 18, wherein the separation operation includes (i) adjusting the temperature of the distiller's corn oil and (ii) filtering or centrifuging the distiller's corn oil.

24. The rubber composition of claim 18, wherein the separation operation includes neutralizing the distiller's corn oil and filtering or centrifuging it.

* * * * *